(12) United States Patent
Shen

(10) Patent No.: US 12,432,687 B2
(45) Date of Patent: Sep. 30, 2025

(54) COMMUNICATION METHOD AND APPARATUS, DEVICE, SYSTEM, AND STORAGE MEDIUM

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 480 days.

(21) Appl. No.: 17/563,890

(22) Filed: Dec. 28, 2021

(65) Prior Publication Data

US 2022/0124669 A1 Apr. 21, 2022

Related U.S. Application Data

(63) Continuation of application No. PCT/CN2019/096896, filed on Jul. 19, 2019.

(51) Int. Cl.
*H04W 64/00* (2009.01)
*H04B 17/309* (2015.01)
(Continued)

(52) U.S. Cl.
CPC ........ *H04W 64/006* (2013.01); *H04B 17/309* (2015.01); *H04W 4/023* (2013.01); *H04W 16/22* (2013.01); *H04W 24/10* (2013.01)

(58) Field of Classification Search
CPC ............. G01S 2205/008; G01S 5/0072; H04B 17/309; H04B 7/0626; H04W 16/22;
(Continued)

(56) References Cited

U.S. PATENT DOCUMENTS

2017/0215093 A1* 7/2017 Zhang ................... H04W 24/08
2018/0017973 A1* 1/2018 Teague ................. G05D 1/0088
(Continued)

FOREIGN PATENT DOCUMENTS

CN 104301866 A 1/2015
CN 105682028 A 6/2016
(Continued)

OTHER PUBLICATIONS

International Search Report (ISR) dated Apr. 10, 2020 for Application No. PCT/CN2019/096896.
(Continued)

*Primary Examiner* — Kashif Siddiqui
(74) *Attorney, Agent, or Firm* — Ladas & Parry LLP

(57) ABSTRACT

Embodiments of the present disclosure provide a communication method and apparatus, a device, a system and a storage medium, which relate to the field of communication technology, and can enable a first device, which cannot communicate with a second device through a beam due to obstacle blocking, to acquire a second position and wireless signal information corresponding to the second position through indication information so that the first device can move to the second position and communicate with the second device at the second position, improving the capability of the first device to maintain high-speed data transmission with the second device, enabling the first device to quickly move from a position with poor signal coverage to a nearby position with better signal coverage, and thus achieving wireless signal transmission with a higher data rate, lower latency, and higher reliability.

16 Claims, 8 Drawing Sheets

(51) Int. Cl.
*H04W 4/02* (2018.01)
*H04W 16/22* (2009.01)
*H04W 24/10* (2009.01)

(58) Field of Classification Search
CPC ..... H04W 24/10; H04W 4/023; H04W 4/026; H04W 64/006
See application file for complete search history.

(56) References Cited

U.S. PATENT DOCUMENTS

| | | |
|---|---|---|
| 2018/0146419 A1 | 5/2018 | Raghavan et al. |
| 2018/0159607 A1 | 6/2018 | Rybakowski et al. |
| 2019/0191275 A1 | 6/2019 | Kazemi et al. |
| 2020/0329340 A1* | 10/2020 | Rahman ............... H04B 17/382 |

FOREIGN PATENT DOCUMENTS

| | | |
|---|---|---|
| CN | 109642940 A | 4/2019 |
| WO | 2018231360 A1 | 12/2018 |

OTHER PUBLICATIONS

The EESR of corresponding European application No. 19938657.4, dated Apr. 19, 2022.
Written Opinion of the International Searching Authority dated Apr. 3, 2020 for Application No. PCT/CN2019/096896.
The First Office Action of corresponding European application No. 19938657.4, dated Dec. 18, 2024, 7 pages.

* cited by examiner

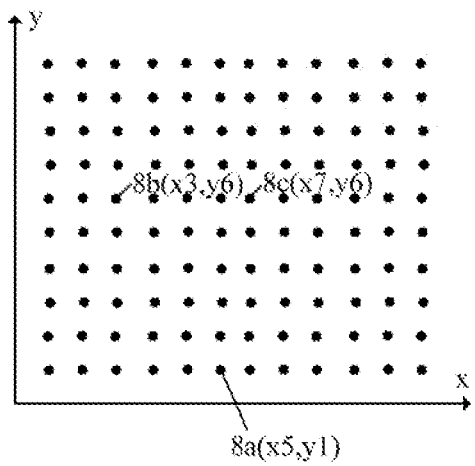
FIG. 8
| Position | Wireless signal information | | |
|---|---|---|---|
| | RSRP | RSRQ | SINR |
| Position ( x1,y1 ) | RSRP ( x1,y1 ) | RSRQ ( x1,y1 ) | SINR ( x1,y1 ) |
| Position ( x2,y1 ) | RSRP ( x2,y1 ) | RSRQ ( x2,y1 ) | SINR ( x2,y1 ) |
| Position ( x3,y1 ) | RSRP ( x3,y1 ) | RSRQ ( x3,y1 ) | SINR ( x3,y1 ) |
| ... | ... | ... | ... |
| Position ( x1,y2 ) | RSRP ( x1,y2 ) | RSRQ ( x1,y2 ) | SINR ( x1,y2 ) |
| Position ( x2,y2 ) | RSRP ( x2,y2 ) | RSRQ ( x2,y2 ) | SINR ( x2,y2 ) |
| Position ( x3,y2 ) | RSRP ( x3,y2 ) | RSRQ ( x3,y2 ) | SINR ( x3,y2 ) |
| ... | ... | ... | ... |
FIG. 9
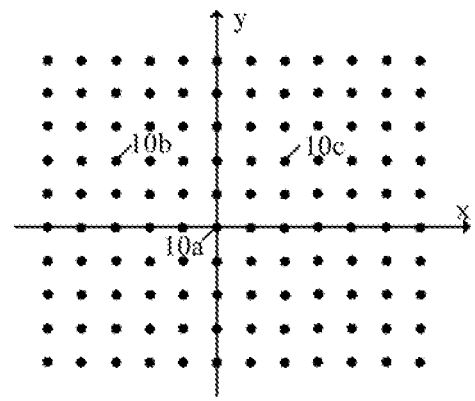
FIG. 10

| Position | Wireless signal information | | |
|---|---|---|---|
| | RSRP | RSRQ | SINR |
| ... | ... | ... | ... |
| Position ( -x3,y1 ) | RSRP ( -x3,y1 ) | RSRQ ( -x3,y1 ) | SINR ( -x3,y1 ) |
| Position ( -x2,y1 ) | RSRP ( -x2,y1 ) | RSRQ ( -x2,y1 ) | SINR ( -x2,y1 ) |
| Position ( -x1,y1 ) | RSRP ( -x1,y1 ) | RSRQ ( -x1,y1 ) | SINR ( -x1,y1 ) |
| Position ( x0,y1 ) | RSRP ( x0,y1 ) | RSRQ ( x0,y1 ) | SINR ( x0,y1 ) |
| Position ( x1,y1 ) | RSRP ( x1,y1 ) | RSRQ ( x1,y1 ) | SINR ( x1,y1 ) |
| Position ( x2,y1 ) | RSRP ( x2,y1 ) | RSRQ ( x2,y1 ) | SINR ( x2,y1 ) |
| Position ( x3,y1 ) | RSRP ( x3,y1 ) | RSRQ ( x3,y1 ) | SINR ( x3,y1 ) |
| ... | ... | ... | ... |
| Position ( -x3,y0 ) | RSRP ( -x3,y0 ) | RSRQ ( -x3,y0 ) | SINR ( -x3,y0 ) |
| Position ( -x2,y0 ) | RSRP ( -x2,y0 ) | RSRQ ( -x2,y0 ) | SINR ( -x2,y0 ) |
| Position ( -x1,y0 ) | RSRP ( -x1,y0 ) | RSRQ ( -x1,y0 ) | SINR ( -x1,y0 ) |
| Position ( x0,y0 ) | RSRP ( x0,y0 ) | RSRQ ( x0,y0 ) | SINR ( x0,y0 ) |
| Position ( x1,y0 ) | RSRP ( x1,y0 ) | RSRQ ( x1,y0 ) | SINR ( x1,y0 ) |
| Position ( x2,y0 ) | RSRP ( x2,y0 ) | RSRQ ( x2,y0 ) | SINR ( x2,y0 ) |
| Position ( x3,y0 ) | RSRP ( x3,y0 ) | RSRQ ( x3,y0 ) | SINR ( x3,y0 ) |
| ... | ... | ... | ... |
| Position ( -x3,-y1 ) | RSRP ( -x3,-y1 ) | RSRQ ( -x3,-y1 ) | SINR ( -x3,-y1 ) |
| Position ( -x2,-y1 ) | RSRP ( -x2,-y1 ) | RSRQ ( -x2,-y1 ) | SINR ( -x2,-y1 ) |
| Position ( -x1,-y1 ) | RSRP ( -x1,-y1 ) | RSRQ ( -x1,-y1 ) | SINR ( -x1,-y1 ) |
| Position ( x0,-y1 ) | RSRP ( x0,-y1 ) | RSRQ ( x0,-y1 ) | SINR ( x0,-y1 ) |
| Position ( x1,-y1 ) | RSRP ( x1,-y1 ) | RSRQ ( x1,-y1 ) | SINR ( x1,-y1 ) |
| Position ( x2,-y1 ) | RSRP ( x2,-y1 ) | RSRQ ( x2,-y1 ) | SINR ( x2,-y1 ) |
| Position ( x3,-y1 ) | RSRP ( x3,-y1 ) | RSRQ ( x3,-y1 ) | SINR ( x3,-y1 ) |
| ... | ... | ... | ... |

FIG. 11

| Position | Wireless signal information | | |
|---|---|---|---|
| | RSRP | RSRQ | SINR |
| Position ( r1,φ0 ) | RSRP ( r1,φ0 ) | RSRQ ( r1,φ0 ) | SINR ( r1,φ0 ) |
| Position ( r1,φ1 ) | RSRP ( r1,φ1 ) | RSRQ ( r1,φ1 ) | SINR ( r1,φ1 ) |
| Position ( r1,φ2 ) | RSRP ( r1,φ2 ) | RSRQ ( r1,φ2 ) | SINR ( r1,φ2 ) |
| Position ( r1,φ3 ) | RSRP ( r1,φ3 ) | RSRQ ( r1,φ3 ) | SINR ( r1,φ3 ) |
| Position ( r1,φ4 ) | RSRP ( r1,φ4 ) | RSRQ ( r1,φ4 ) | SINR ( r1,φ4 ) |
| ... | ... | ... | ... |

COMMUNICATION METHOD AND APPARATUS, DEVICE, SYSTEM, AND STORAGE MEDIUM

CROSS-REFERENCE TO RELATED APPLICATION

This application is a continuation of International Application No. PCT/CN2019/096896, filed on Jul. 19, 2019, the content of which is incorporated herein by reference in its entirety.

TECHNICAL FIELD

The present disclosure relates to the field of communication technology and, in particular, to a communication method and apparatus, a device, a system, and a storage medium.

RELATED ARTS

A 5G new radio (NR for short) system communicates with a first device by using a millimeter wave frequency band. For a signal in the millimeter wave frequency baud, a beam is generated through analog beamforming and hybrid beamforming technologies. A second device communicates with the first device through the beam.

In some possible application scenarios, if there is an obstacle between the second device and the first device, even if the first device is within a beam range of the second device, the first device cannot communicate with the second device through a millimeter wave frequency band-based beam due to weak diffraction capability of the signal in the millimeter wave frequency band, thereby greatly reducing the capability of transmitting data by the first device.

SUMMARY

Embodiments of the present disclosure provide a communication method.

In one aspect, a communication method is provided, which is applied to a first device, where the first device is located at a first position, and the method includes:
    receiving indication information transmitted by a second device, where the indication information includes information of a second position and wireless signal information corresponding to the second position, and the second position is different from the first position.

In another aspect, a communication method is provided which is applied to a second device and includes:
    transmitting indication information to a first device, where the indication information includes information of a second position and wireless signal information corresponding to the second position, the first device is located at a first position, and the second position is different from the first position.

In another aspect, a communication apparatus is provided, which is applied to a first device, where the first device is located at a first position, and the apparatus includes:
    a receiving module, configured to receive indication information transmitted by a second device, where the indication information includes information of a second position and wireless signal information corresponding to the second position, and the second position is different from the first position.

In another aspect, a communication apparatus is provided, which is applied to a second device and includes:

a transmitting module, configured to transmit indication information to a first device, where the indication information includes information of a second position and wireless signal information corresponding to the second position, the first device is located at a first position, and the second position is different from the first position.

In another aspect, a device is provided, including: a processor and a memory, where the memory has at least one instruction stored thereon, and the at least one instruction is used for execution by the processor to perform the communication method implemented by the first device according to an embodiment of the present disclosure.

In another aspect, a device is provided, including: a processor and a memory, where the memory has at least one instruction stored thereon, and the at least one instruction is used for execution by the processor to perform the communication method implemented by the second device according to an embodiment of the present disclosure.

In another aspect, a computer readable storage medium is provided, where the storage medium has at least one instruction stored thereon, and the at least one instruction is used for execution by a processor to implement the communication method implemented by the first device.

In another aspect, a computer readable storage medium is provided, where the storage medium has at least one instruction stored thereon, and the at least one instruction is used for execution by a processor to implement the communication method implemented by the second device.

In another aspect, a communication system is provided, including: the first device and the second device.

BRIEF DESCRIPTION OF DRAWINGS

In order to illustrate the technical solutions in the embodiments of the present disclosure more clearly, the accompanying drawings required in the description of the embodiments will be briefly described below. Apparently, the drawings in the following description are merely some embodiments of present disclosure. For persons of ordinary skill in the art, other drawings may be obtained based on these drawings without any creative efforts.

FIG. 8 is a schematic diagram illustrating absolute coordinate information, based on the embodiment shown in FIG. 7;

FIG. 9 is a table illustrating a correspondence between absolute coordinate information and wireless signal information, based on the embodiment shown in FIG. 8;

FIG. 10 is a schematic diagram illustrating position information of a second position using a position of the first device as a reference, based on the embodiment shown in FIG. 7;

FIG. 11 is a table illustrating a correspondence between position information of the second position and wireless signal information, based on the embodiment shown in FIG. 10;

DESCRIPTION OF EMBODIMENTS

Figure 1:
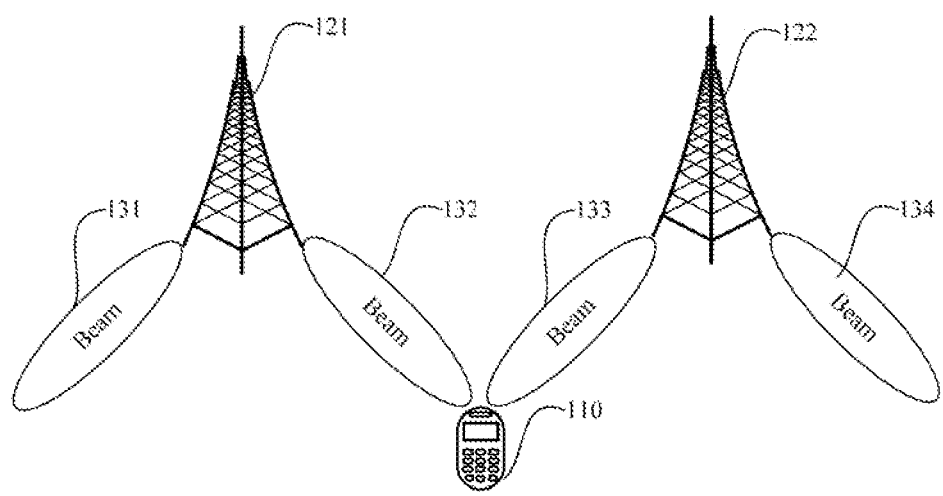
FIG. 1 is a schematic diagram illustrating a beam measurement based on an embodiment of the present disclosure.

In order to make objectives, technical solutions, and advantages of the present disclosure clearer, the embodiments of the present disclosure will be further described in detail below in conjunction with the accompanying drawings.

The "module" mentioned herein generally refers to a program or instructions stored in a memory that can realize certain functions; the "unit" mentioned herein generally refers to a functional structure divided logically, and the "unit" can be realized by pure hardware or a combination of software and hardware.

The "multiple" mentioned herein refers to two or more. The "and/or" describes an association relationship between associated objects, which indicates that there may be three relationships, for example, A and/or B may indicate presence of A only, of both A and B, and of B only. The character "/" generally indicates that contextual objects have an "or" relationship. The "first", "second" and similar words used in the description and claims of the present disclosure do not imply any order, quantity or importance, but are only used to distinguish different compositions.

In some possible implementations, in a 4G system, other devices communicate with a first device by using a low-mid frequency band which generally refers to a frequency band below 6 GHz. Since the low-mid frequency band has a limited bandwidth, the transmission data rate achieved by the 4G system is lower than that of a 5G system or a 6G (6th generation mobile networks) system. The frequency at the frequency band used by the 5G system or the 6G system is higher than the frequency at the frequency band used by the 4G system. The 5G system uses millimeter waves, and the 6G system is expected to use a frequency band at which the frequency is higher. For example, the 6G system transmits data by using at least one of a frequency band above 100 GHz, a frequency band of terahertz (Tera Hertz, THz for short), or a frequency band of visible light.

In practical applications, a signal with a high frequency such as a millimeter wave has a relatively high transmission loss during transmission, resulting in small signal coverage. In order to solve the problem of the small coverage of the high-frequency signal, analog beamforming and hybrid beamforming technologies have been introduced in the 5G system.

The beamforming technology improves the signal coverage of the 5G system and the 6G system by concentrating transmitting capability and gains of a receiving antenna in a specific direction under a line-of-sight (LOS for short) channel environment. On the other band, since a millimeter wave signal lacks diffraction capability, the effect of signal blocking cannot be conquered when the millimeter wave signal suffers obstacle blocking, and thus it is impossible to achieve effective signal transmission. In other words, for a signal with a high frequency such as a millimeter wave signal, it is difficult to achieve effective coverage under a non-line-of-sight (NLOS for short) channel environment.

In a solution to address the signal coverage problem, the 5G system uses beam measurement and beam management technologies to find beams that can achieve effective coverage. The above-mentioned technologies lie in a first device reporting, based on a beam measurement of a second device, a measurement result to the second device, and the second device scheduling the first device to access a specified beam, or the first device initiatively selecting a beam to access. In the solution to address the signal coverage problem, the first device can measure and/or compare all received beams, and transmit the measurement result to the second device.

Please refer to FIG. 1, which is a schematic diagram illustrating a beam measurement based on an embodiment of the present disclosure. In FIG. 1, a first device 110, a second device 121 and a second device 122 are included. Beams provided by the second device 121 include a beam 131 and a beam 132, and beams provided by the second device 122 include a beam 133 and a beam 134. The first device 110 can measure the beam 132 and the beam 133. The first device 110 can access the beam 132 under control of the second device 121, or access the beam 133 under control of the second device 122, or initiatively compare the beam 132 with the beam 133 to select the beam with higher signal quality to access.

Figure 2:
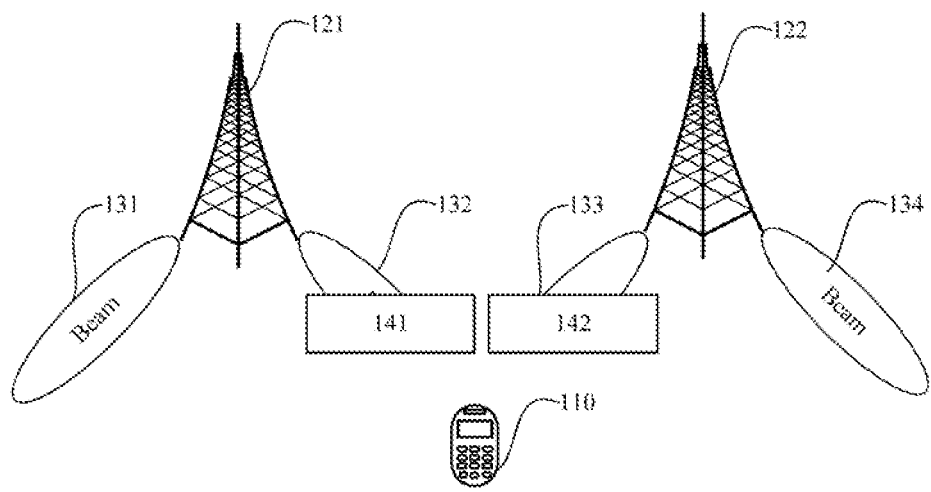
FIG. 2 is a schematic diagram illustrating another measurement based on an embodiment of the present disclosure.

Please refer to FIG. 2, which is a schematic diagram illustrating another beam measurement based on an embodiment of the present disclosure. In FIG. 2, a first device 110, a second device 121 and a second device 122 are included. Beams provided by the second device 121 include a beam 131 and a beam 132, and beams provided by the second device 122 include a beam 133 and a beam 134. In the scenario shown in FIG. 2, there are an obstacle 141 and an obstacle 142. The obstacle 141 is located in a physical space between the second device 121 and the first device 110 and the obstacle 141 blocks the beam 132, resulting in that the first device 110 cannot measure the beam 132. The obstacle 142 is located in a physical space between the second device 122 and the first device 110, and the obstacle 142 blocks the beam 133, resulting in that the first device 110 cannot measure the beam 133. In this scenario, for the second device 121 and the second device 122, the first device 110 cannot measure any available beam, resulting in that the first device 110 cannot efficiently transmit data at a high speed.

In view of the above beam measurement technical solution where the first device cannot achieve effective high-speed data transmission with the second device through a beam, the present disclosure provides a communication method, applied to the first device, where the first device is located at a first position. The method includes: receiving indication information transmitted by the second device, where the indication information includes information of a second position and wireless signal information corresponding to the second position, and the second position is different from the first position.

In a possible implementation, the method further comprises: moving to the second position in a case where wireless signal strength corresponding to the second position is higher than wireless signal strength of the first position; or moving to the second position in a case where wireless signal quality corresponding to the second position is higher than wireless signal quality of the first position; or moving to the second position in a case where wireless signal strength corresponding to the second position is higher than wireless signal strength of the first position and wireless signal quality corresponding to the second position is higher than wireless signal quality of the first position.

In a possible implementation, the indication information is transmitted through one kind of the following signaling:
radio resource control RRC signaling;
media access control control element MAC CE;
downlink control information DCI;
sidelink control information SCI.

In a possible implementation, the wireless signal information includes at least one kind of the following:
received signal strength of a wireless signal, where the received signal strength includes reference signal received power RSRP;
received signal quality of the wireless signal, where the received signal quality includes reference signal received quality RSRQ and/or a signal to interference plus noise ratio SINR;
a rate of the wireless signal;
time domain information corresponding to the information of the second position and the wireless signal information.

In a possible implementation, the wireless signal is a beam-level wireless signal or a cell-level wireless signal.

In a possible implementation, the information of the second position includes at least one kind of the following:
position information of the second position based on a navigation satellite;
position information of the second position using a position of the first device as a reference;
position information of the second position using a position of the second device as a reference.

In a possible implementation, the position information of the second position using the position of the first device as the reference includes: a directional angle between the second position and the first position, and a distance between the second position and the first position.

In a possible implementation, the position information of the second position using the position of the second device as the reference includes: a directional angle between the second position and a position at which the second device is located, and a distance between the second position and the position at which the second device is located.

In a possible implementation, the second device is an access network device, and the wireless signal information is used to indicate received signal strength and/or received signal quality of a reference signal transmitted by the access network device through a Uu interface or the second device is a user equipment UE, and the wireless signal information is used to indicate received signal strength and/or received signal quality of a reference signal transmitted by the UE through a sidelink interface.

In a possible implementation, the second position is a position where the first device will pass at a first time, and the first time is a future time relative to a current system time.

In another possible approach provided in the present disclosure, a communication method is provided. The method is applied to the second device and includes:
transmitting indication information to the first device, where the indication information includes information of a second position and wireless signal information corresponding to the second position, the first device is located at a first position, and the second position is different from the first position.

In a possible implementation, the indication information is transmitted through one kind of the following signaling:
radio resource control RRC signaling;
media access control control element MAC CE;
downlink control information DCI;
sidelink control information SCI.

In a possible implementation, the wireless signal information includes at least one kind of the following:
received signal strength of a wireless signal, where the received signal strength includes reference signal received power RSRP;
received signal quality of the wireless signal, where the received signal quality includes reference signal received quality RSRQ and/or a signal to interference plus noise ratio SINR;
a rate of the wireless signal;
time domain information corresponding to the information of the second position and the wireless signal information.

In a possible implementation, the wireless signal s a beam-level wireless signal or a cell-level wireless signal.

In a possible implementation, the information of the second position includes at least one kind of the following:
position information of the second position based on a navigation satellite;
position information of the second position using a position of the first device as a reference; or
position information of the second position using a position of the second device as a reference.

In a possible implementation, the position information of the second position using the position of the first device as the reference includes: a directional angle between the second position and the first position, and a distance between the second position and the first position.

In a possible implementation, the position information of the second position using the position of the second device as the reference includes: a directional angle between the second position and a position at which the second device is located, and a distance between the second position and the position at which the second device is located.

In a possible implementation, the second device is an access network device, and the wireless signal information is used to indicate received signal strength and/or received signal quality of a reference signal transmitted by the access network device through a Un interface; or the second device is a user equipment UE, and the wireless signal information is used to indicate received signal strength and/or received signal quality of a reference signal transmitted by the UE through a sidelink interface.

In a possible implementation, the second position is a position where the first device will pass at a first time, and the first time is a future time relative to a current system time.

It should be noted that a D2D (Device to Device) communication connection is established between the first device and the second device when the second device is a user equipment UE.

Figure 3:
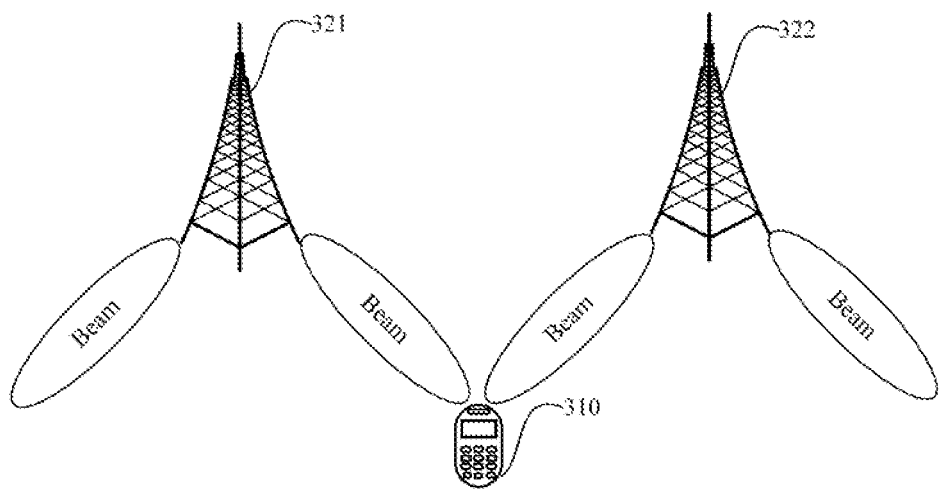
FIG. 3 is a schematic structural diagram illustrating a mobile communication system according to an embodiment of the present disclosure.

Please refer to FIG. 3, which is a schematic structural diagram illustrating a mobile communication system according to an embodiment of the present disclosure. The mobile communication system may be a 5G system, also known as an NR system. In an embodiment, the mobile communication system may also be a 6G system. In FIG. 3, description is made by taking an example where the second device is an access network device. The mobile communication system includes: a user equipment UE 310, an access network device 321, and an access network device 322.

The access network device 321 and the access network device 322 may be base stations (gNBs for short) that adopt a centrally distributed architecture in the 5G system. When a base station adopts the centrally distributed architecture, a central unit (CU for short) and at least two distributed units (DUs for short) are generally included. The central unit is provided with packet data convergence protocol (PDCP far short) layer, radio link control protocol (RLC for short) layer, and media access control (MAC for short) layer protocol stack; and the distributed unit is provided with a physical (PHY for short) layer protocol stack. The specific implementation of the base station is not limited in the embodiments of the present disclosure. In an embodiment, the base station may be a relay, a home base station (Home eNB, HeNB for short), a pico base station, etc. In a possible manner, the base station can also be implemented as a network side device.

The access network device 321 (or the access network device 322) establishes a wireless connection with the user equipment UE 310 through a wireless air interface. In an embodiment, the wireless air interface is a wireless air interface based on a 5G standard. For example, the wireless air interface is a new radio (NR for short). Or, the wireless air interface may also be a wireless air interface based on a standard of the next-generation mobile communication network technology of 5G. The next-generation mobile communication network technology standard may be a 6G standard.

The user equipment UE 310 may refer to a device that provides voice and/or data connectivity to a user. The user equipment UE 310 may communicate with one or more core networks via a radio access network (RAN for short). The user equipment UE 310 may be a mobile terminal such as a mobile phone (or known as a "cellular" phone), a computer with a mobile terminal, or a vehicle-mounted terminal.

In a possible manner, the user equipment UE 310 may have autonomous mobility and can autonomously move to a specified position. In another possible manner, the user equipment UE 310 may have an output component, and the output component is capable of outputting specified position information to a user to prompt the user to carry the user equipment UE 310 to a specified position. It should be noted that the specified position information is used to indicate the specified position.

It should be noted that the mobile communication system shown in FIG. 3 may include multiple first devices and/or multiple second devices. Description is made by taking an example of one user equipment UE 310 and two second devices (the second device 321 and the second device 322) shown in FIG. 3, but the number of the related devices is not limited in this embodiment.

An access network device uses a downlink channel to transmit downlink data to a first device. The downlink data may include in data blocks, where m is a positive integer. Each data block includes one or more coding block groups. After receiving the in transport block groups, the user equipment decodes each coding block in the in transport blocks, and generates feedback information of the in transport blocks according to the decoding result.

In an embodiment of the present disclosure, the feedback information includes: transport block-level feedback response information and coding block group-level feedback response information. The transport block-level feedback response information is used to indicate whether a transport block is successfully received, and the coding block group-level feedback response information is used to indicate whether each coding block group in a transport block is successfully received when the transport block is received unsuccessfully.

In an embodiment, the first device is an unmanned device.

In an embodiment, the first device is at least one of a mobile robot, an aircraft, a vehicle, a watercraft, or an underwater craft.

In another mobile communication system according to an embodiment of the present disclosure, the second device may also be a user equipment UE.

Figure 4:
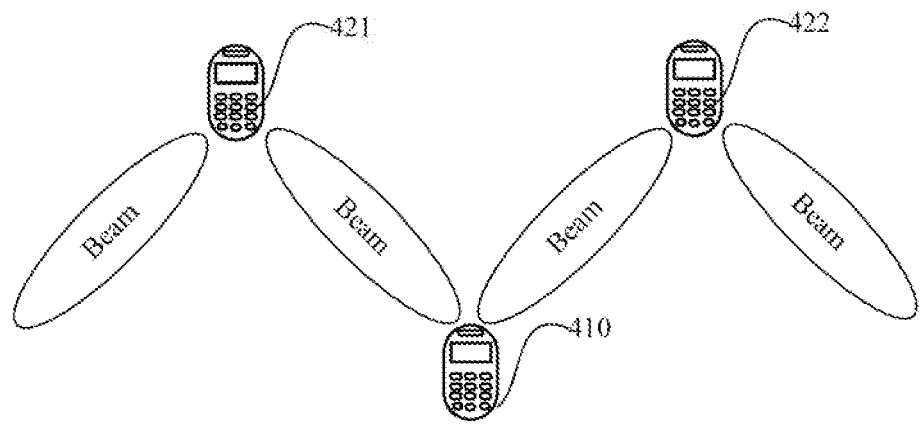
FIG. 4 is a schematic structural diagram illustrating another mobile communication system according to an embodiment of the present disclosure.

Please refer to FIG. 4, which is a schematic structural diagram illustrating another mobile communication system according to an embodiment of the present disclosure. In FIG. 4, a user equipment UE 410, a user equipment UE 421, and a user equipment UE 422 are included. The user equipment UE 410 is a first device, and the user equipment UE 421 and the user equipment UE 422 are second devices.

It should be noted that, in the mobile communication system shown in FIG. 4, a D2D communication connection is adopted between the user equipment UE 410 and the user equipment UE 421, and for a communication interface therebetween, a pc5 interface may be used.

Figure 5:
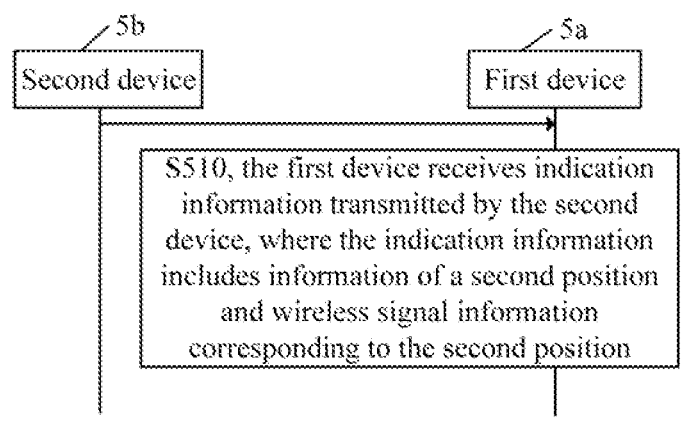
FIG. 5 is a flowchart illustrating a communication method according to an embodiment of the present disclosure.

Please refer to FIG. 5, which is a flowchart illustrating a communication method according to an embodiment of the present disclosure. FIG. 5 includes a mobile communication system, which includes a first device 5a and a second device 5b. For details, reference may be made to the embodiment shown in FIG. 3. In the embodiment shown in FIG. 5, step 510 is included, and description is made as follows:

step 510, the first device receives indication information transmitted by the second device, where the indication information includes information of a second position and wireless signal information corresponding to the second position.

In the embodiment of the present disclosure, the first device is located at a first position. The first device can receive the indication information transmitted by the second device. Generally speaking, a signal used to transmit the indication information has strong diffraction capability, and it can be guaranteed that the first device can receive the indication information even when there is an obstacle between the first device and the second device. It should be noted that the first position is different from the second position, and the indication information received by the first device is used to indicate wireless signal information other than the first position where the first device is located.

In a possible implementation, the second device can first transmit, in a first group of data packets, the information of the second position to the first device, and transmit, in a second group of data packets, the wireless signal information corresponding to the second position to the lust device. The first group of data packets and the second group of data packets are only different in naming, while a time domain relationship and/or a frequency domain relationship between the first group of data packets and the second group of data packets during transmission are not limited in the embodiment of the present disclosure.

In another possible implementation, the second device transmits, in the same group of data packets, the information of the second position and the wireless signal information corresponding to the second position to the first device.

In another possible implementation, the second device transmits, in one data packet, the information of the second position and the wireless signal information corresponding to the second position to the first device.

It should be noted that the several possible implementations described above can be initiatively selected and designed according to actual conditions, and the information of the second position and the wireless signal information corresponding to the second position are not limited in the present disclosure with regard to their specific transmitting modes. With the method provided in the embodiment of the present disclosure, the indication information can be received by the first device, and the indication information includes the information of the second position and the wireless signal information corresponding to the second position.

Corresponding to the description of step 510, the second device transmits the indication information to the first device.

In an embodiment of the present disclosure, the wireless signal may be a beam-level wireless signal, or a cell-level wireless signal, or a wireless signal of another frequency band, which is not limited in the embodiment of the present disclosure. A beam is used as an example for description.

Figure 6:
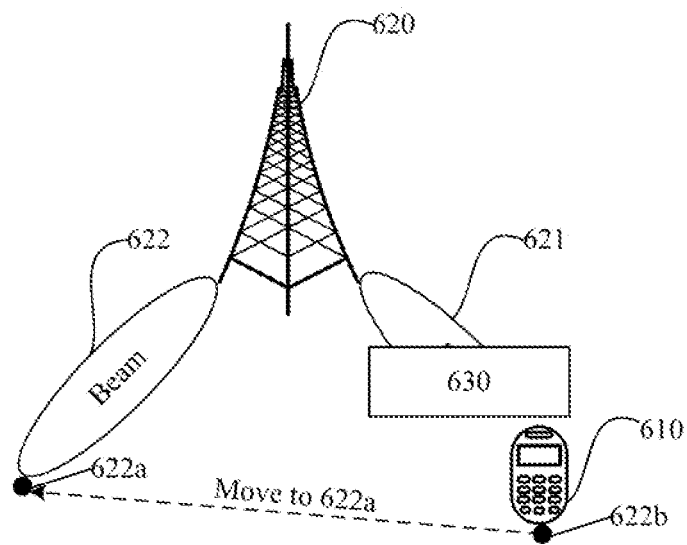
FIG. 6 is a schematic diagram illustrating a communication method based on the embodiment shown in FIG. 5.

Please refer to FIG. 6, which is a schematic diagram illustrating a communication method based on the embodiment shown in FIG. 5. In FIG. 6, a first device 610, a second device 620, and an obstacle 630 are included. The obstacle 630 is located between the first device 610 and the second device 620, and blocks the beam 621 provided by the second device 620 to the first position where the first device 610 is currently located. Indication information is transmitted between the first device 610 and the second device 620 through a signal with strong diffraction capability, and the indication information includes information of a second position and wireless signal information corresponding to the second position, where the information of the second position is used to indicate the second position 622a, and the wireless signal information is used to indicate information of the beam 622 provided by the second device 620 and at the second position 622a. The first device 610 is currently in the first position 622b.

In a subsequent procedure, in an embodiment, if the first device has autonomous mobility, the first device can move to the second position 622a, and perform effective high-speed data transmission with the second device 620 through the beam 622.

In a possible manner, the first device can also move to the second position under a specified condition.

In a movement manner, the first device moves to the second position in a case where the wireless signal strength corresponding to the second position is higher than the wireless signal strength of the first position.

It should be noted that, taking the embodiment shown in FIG. 6 as an example for description, the first device 610 moves to the second position 622a in a case where the wireless signal strength of the second position 622a is higher than the wireless signal strength of the first position 622b.

In another movement manner the first device moves to the second position in a case where the wireless signal quality corresponding to the second position is higher than the wireless signal quality of the first position.

It should be noted that, taking the embodiment shown in FIG. 6 as an example for description, the first device 610 moves to the second position 622a in a case where wireless signal quality of the second position 622a is higher than wireless signal quality of the first position 622b.

In another movement manner, the first device moves to the second position when the wireless signal quality corresponding to the second position is higher than the wireless signal quality of the first position and the wireless signal strength corresponding to the second position is higher than the wireless signal strength of the first position.

It should be noted that, taking the embodiment shown in FIG. 6 as an example for description, the first device 610 moves to the second position 622a in a case where the wireless signal quality of the second position 622a is higher than the wireless signal quality of the first position 622b and the wireless signal strength of the second position 622a is higher than the wireless signal strength of the first position 622b.

To sum up, the first device can receive indication information transmitted by the second device through a signal with strong diffraction capability and the indication information includes information of a second position and wireless signal information corresponding to the second position, thus in a case where there is an obstacle blocking the beam between the first deice and the second device, the embodiment of the present disclosure is capable of enabling the first device to smoothly receive the information of the second position and the wireless signal information corresponding to the second position, so that the first device moves to this position to perform effective high-speed data transmission with the second device, thereby improving the capability of the first device to maintain effective high-speed data transmission.

Figure 7:
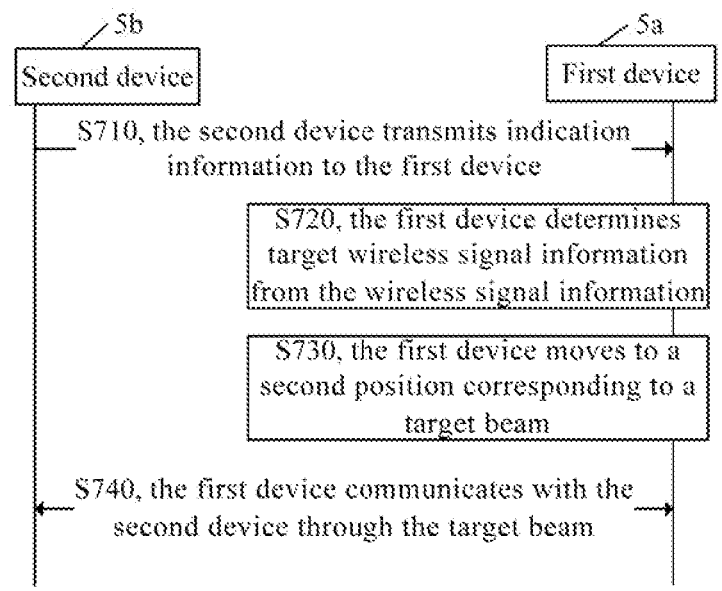
FIG. 7 is a flowchart illustrating a communication method based on the embodiment shown in FIG. 5.

In an embodiment of the present disclosure, the first device may have autonomous mobility. After receiving indication information transmitted by the second device, the first device may determine information of a target beam from beam information in the indication information, then autonomously move to the position corresponding to the target beam, and communicate with the second device through the target beam. A detailed implementation process may be seen in FIG. 7, which is a flowchart illustrating a communication method based on the embodiment shown in FIG. 5. In FIG. 7, the first device 5a and the second device 5b are included, and the method includes:

step 710, the second device transmits indication information to the first device.

In the embodiment of the present disclosure, the indication information may be signaling transmitted through a signal with strong diffraction capability. The indication information may include information of a second position and wireless signal information corresponding to the second position.

In an embodiment, the second device may be an access network device or a user equipment UE.

In an embodiment, the indication information includes at least one kind of the following: radio resource control RRC signaling; medium access control control element MAC CE: downlink control information DCI: or sidelink control information SCI.

In an embodiment, the wireless signal information is a beam-level wireless signal or a cell-level wireless signal.

In a possible implementation, the wireless signal information is a beam-level wireless signal for a single beam.

In a possible implementation, the wireless signal information is a cell-level wireless signal of a cell including multiple beams.

In an embodiment, the wireless signal information includes received signal strength and/or signal quality information.

In one case, the wireless signal information includes received signal strength.

In another case, the wireless signal information includes signal quality information.

In another case, the wireless signal information includes received signal strength and signal quality information.

In an embodiment, the wireless signal information includes received signal strength of a wireless signal, where the received signal strength includes reference signal received power RSRP.

In an embodiment, the wireless signal information includes received signal quality of the wireless signal, where the received signal quality includes reference signal received quality RSRQ and/or a signal to interference plus noise ratio SINR.

In an embodiment, the wireless signal information includes received signal strength of the wireless signal and received signal quality of the wireless signal.

In an embodiment, the second device is an access network device, and the wireless signal information is used to indicate received signal strength and/or received signal quality of a reference signal transmitted by the access network device through a Uu interface; or the second device is a user equipment LIE, and the wireless signal information is used to indicate received signal strength and/or received signal quality of a reference signal transmitted by the UE through a sidelink interface.

It should be noted that, in a possible implementation, the Liu interface may also be termed as a uu reference point.

In an embodiment, the information of the second position includes at least one kind of the following: position information of the second position based on a navigation satellite; position information of the second position using the position of the first device as a reference; and position information of the second position using, the position of the second device as a reference.

In the embodiment of the present disclosure, the navigation satellite may be a satellite device provided by a specified navigation system. The specified navigation system includes at least one kind of the following: a GPS (Global Positioning System), a Beidou navigation satellite system (BDS for short), a global navigation satellite system (GLONASS for short), or a Galileo (Galileo satellite navigation system).

Please refer to FIG. 8, which is a schematic diagram illustrating absolute coordinate information, based on the embodiment shown in FIG. 7. In FIG. 8, signal strength or quality information of the second position around the first device can be transmitted to the first device in the indication information. In FIG. 8, a position is represented by absolute coordinate information. A first device 8a can calculate relative distances and orientations with respect to a second device 8b (x3, y6) and a second device 8c (x7, y6) through its own coordinate information (x5, y1).

Based on the same coordinate system, the first device can also acquire information of each second position and wireless signal information corresponding to the second position. In FIG. 8, apart from the positions 8a, 8b and 8c, the position of each coordinate point can serve as the second position.

On this basis, the first device can select one or more second positions, so that the first device moves to a second position or connects multiple second positions into a route to form an ideal navigation route for data transmission.

Meanwhile, please refer to FIG. 9, which is a table illustrating a correspondence between absolute coordinate information and wireless signal information, based on the embodiment shown in FIG. 8. In the table shown FIG. 9, a position is represented by absolute coordinate information, while wireless signal information is represented by RSRP, RSRQ, and SINR.

It should be noted that, based on the wireless signal information in the table of FIG. 9, different second positions have different wireless signal information. The first device may determine, according to the wireless signal information, at which second position can better signal coverage be acquired, and then move to the second position with better signal coverage to achieve communication at a higher data rate.

In an embodiment, the position information of the second position using the position of the first device as the reference includes: a directional angle between the second position and the first position, and a distance between the second position and the first position.

Please refer to FIG. 10, which is a schematic diagram illustrating position information of the second position using the position of the first device as the reference, based on the embodiment shown in FIG. 7. In FIG. 10, the information of the second position is position information using position information of the first device as the reference. The position of the first device may be used as the origin of a rectangular plane coordinate system to describe position information of the second position. That is, the first position is used as the origin of the rectangular plane coordinate system. The second device transmits the information of the second position to the first device through indication information. The information of the second position will correspond to at least one of RSRP, RSRQ, or an SINR. In FIG. 10, the position where the first device 10a is located has coordinates of (x0, y0), that is, the coordinate origin. The second device 10b has coordinates of (−3x, y2) The second device 10c has coordinates of (x2, y2). The first device 10a can calculate the distance and the orientation from a second device through the coordinate information described above.

Based on the same coordinate system, the first device can also acquire information of each second position and wireless signal information corresponding to the second position. In FIG. 10, apart from the positions 10a, 10b and 10c, the position of each coordinate point can serve as the second position.

On this basis, the first device can select one or more second positions, so that the first device moves to a second position or connects multiple second positions into a route to form an ideal navigation route for data transmission.

Meanwhile, please refer to FIG. 11, which is a table illustrating a correspondence between position information of the second position and wireless signal information, based on the embodiment shown in FIG. 10. In the table shown in FIG. 11, the second position is represented using the position of the first device as the reference, and the wireless signal information is represented by RSRP, RSRQ, and an SINR.

Figures 12, 13:
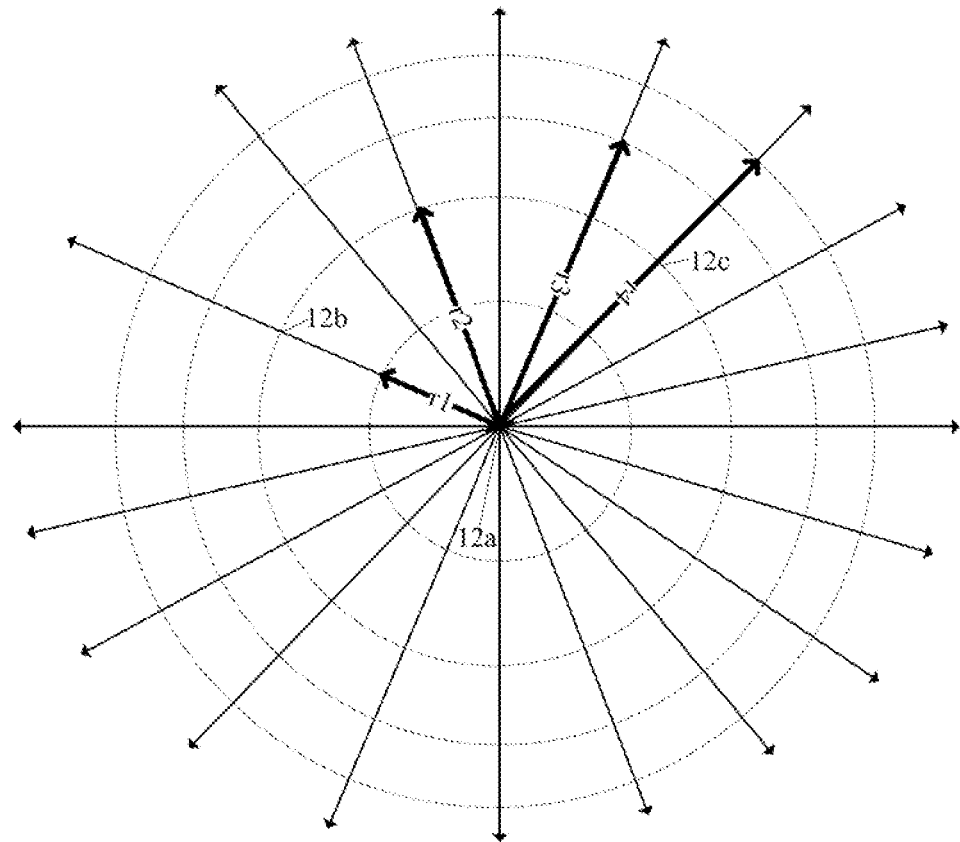
FIG. 12 is another schematic diagram illustrating information of the second position, based on the embodiment shown in FIG. 7.
FIG. 13 is a table illustrating a correspondence between information of the second position and wireless signal information, based on the embodiment Shown in FIG. 12.

Please refer to FIG. 12, which is another schematic diagram illustrating information of the second position, based on the embodiment shown in FIG. 7. In FIG. 12, the information of the second position is position information using the first device as the reference. The position of the first device may be used as the origin, that is, the first position is the origin, and the information of the second position can be used to indicate position information of the second position through a combination of a distance r and an angle φ relative to the position of the first device.

FIG. 12 includes a first device 12*a*, a second device 12*b*, and a second device 12*c*. The second device 12*h* has a position of (r2, φ8), and the second device 12*c* has a position of (r2, φ3).

Please refer to FIG. 13, which is a table illustrating a correspondence between information of the second position and wireless signal information, based on the embodiment shown in FIG. 12. In the table shown in FIG. 13, the position is represented by information relative to the first position, and the wireless signal information is represented by RSRP, RSRQ, and an SINR.

Similarly, using the position of the first device as the reference, the first device can also acquire information of each second position and wireless signal information corresponding to the second position. In FIG. 12, apart from the positions 12*a*, 12*b* and 12*c*, the position of each coordinate point can serve as the second position.

On this basis, the first device can select one or more second positions, so that the first device moves to a second position or connects multiple second positions into a route to form an ideal navigation route for data transmission.

In an embodiment, the information of the second position includes a directional angle between the second position and the position at which the second device is located, and a distance between the second position and the position at which the second device is located.

Figure 14:
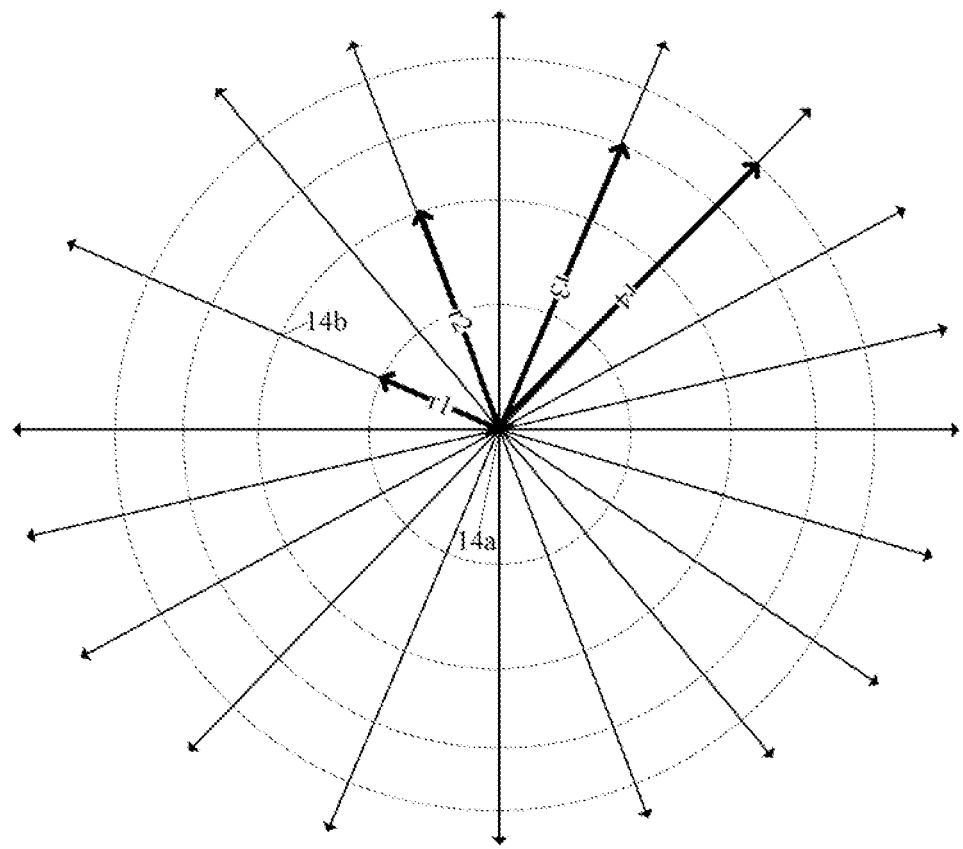
FIG. 14 is a schematic diagram illustrating information of a second position, based on the embodiment shown in FIG. 7.

Please refer to FIG. 14, which is a schematic diagram illustrating information of the second position, based on the embodiment shown in FIG. 7. In FIG. 14, the information of the second position is position information using the second device as the reference. The information of the second position is a combination of a distance r and an angle φ relative to the position of the second device, and the information of the second position is used to indicate the position relative to the position where the second device is located.

It should be noted that the data format shown in FIG. 14 is similar to the data tom-mat shown in FIG. 12, except that the reference in FIG. 12 is the position of the first device while the reference in FIG. 14 is the position where the second device is located. In FIG. 14, a second device 14*a* is located at a reference position, and a first device 14*b* is located at a position of (r2, φ8).

In the representation of the position information shown in FIG. 14, the second device may not need to acquire the position information of the first device, which simplifies the procedure of indicating the position information, thereby enabling the first device to quickly move from the first position with poor signal coverage to the second position nearby with better signal coverage so that wireless signal transmission with a higher rate, lower delay and higher reliability is achieved.

In an embodiment, the wireless signal information further includes a rate of the wireless signal.

In a possible implementation, the wireless signal information includes a downlink rate.

In another possible implementation, the wireless signal information includes an uplink rate.

In another possible implementation, the wireless signal information includes a downlink rate and an uplink rate.

It should be noted that the rate may also be a value calculated according to the uplink rate and the downlink rate. The calculation method includes an average method, or a weighted average method, or others, which is not limited in the embodiment of the present disclosure.

In an embodiment, the wireless signal information further includes time domain information, where the time domain information is time domain information corresponding to the information of the second position and the wireless signal information.

In a possible implementation, the wireless signal information includes 100 position points and wireless signal information of the 100 position points.

In another possible implementation, if the wireless signal transmitted by the second device changes periodically with a period of 10 moments, the wireless signal information may include 10 sets of information, where each set of information includes, at each of the 10 moments, respective 100 position points and wireless signal information of the 100 position points.

In one possible manner, received signal strength and/or signal quality information of a beam changes periodically. In this scenario, the time domain information may include a time when the beam is measured and period information of the beam. The first device can determine, through the time when the beam is measured and the period information of the beam, at which times can a beam with the same received signal strength and/or received signal quality be acquired again at the second position in the future.

In another possible manner, received signal strength and/or received signal quality of a beam changes periodically. In this scenario, the time domain information may include the received signal strength and/or the received signal quality at various times in the period. The first device can determine, through the time domain information, the received signal strength and/or the received signal quality of the second position at various times in the future.

Correspondingly, on the first device side, the first device receives the indication information transmitted by the second device.

Step 720, the first device determines target wireless signal information from the wireless signal information.

In the embodiment of the present disclosure, the first device can determine target wireless signal information from the wireless signal information. The target wireless signal information can conform to a communication requirement of the first device and the second device. In an embodiment, the communication requirement may be at least one kind of the following: received signal strength, received signal quality, or a transmission rate, where the transmission rate may be at least one of the uplink rate or the downlink rate.

It should be noted that the target wireless signal information is used to indicate a target beam.

Step 730, the first device moves to a second position corresponding to a target beam.

In the embodiment of the present disclosure, the first device has autonomous mobility and can initiatively move to the second position corresponding to the target beam.

In an embodiment, before performing step 730, the first device may also evaluate the second position corresponding to the target beam. The first device, when deriving through a calculation that the second position corresponding to the target beam cannot be reached, may determine other target wireless signal information from the wireless signal information again. In another possible manner, centering on the second position corresponding to the target beam, the first device may also determine a reachable position closest to the second position, and then determine, according to the wireless signal information, wireless signal information corresponding to the reachable position. If the beam can conform to the communication requirement of the first device and the second device, the first device moves to the reachable position.

In another possible manner, the first device can also transmit the information of the second position to the second device. The second position is a position where the first device will pass at a first time, and the first time is a future time relative to a current system time.

In a possible manner, the first device can transmit target position information of a target position in a planned route to the second device. After receiving the target position information, the second device may maintain the target position indicated by the target position information within beam coverage. In an embodiment, when the position corresponding to the target position information is not in the beam coverage, the second device may feedback, to the first device, a position which is in the beam coverage and is closest to the position that is not in the beam coverage, and subsequently the first device may update the route point that is not in the beam coverage to be the position which is closest thereto and is in the beam coverage, thereby completing the adjustment of the navigation route so that the first device can maintain effective high-speed data transmission throughout the entire navigation route.

Step 740, the first device communicates with the second device through the target beam.

In the embodiment of the present disclosure, after the first device moves to the position corresponding to the target beam, the first device can communicate with the second device through the target beam.

Correspondingly, on the second device side, the second device communicates with the first device through the target beam.

To sum up, in the solution shown in the embodiment of the present disclosure, when the first device cannot perform effective high-speed data transmission with the second device through a beam due to an obstacle therebetween, the first device may acquire information of a second position and wireless signal information corresponding to the second position through indication information, and move to the second position to communicate with the second device at the second position; since the target beam corresponding to the second position can satisfy the communication requirement between the first device and the second device, the present disclosure improves the capability of the first device to maintain effective high-speed data transmission and improves the communication efficiency of the first device.

The following describes apparatus embodiments of the present disclosure, which can be used to implement the method embodiments of the present disclosure. For details that are not disclosed in the apparatus embodiments of the present disclosure, reference may be made to the method embodiments of the present disclosure.

Figure 15:
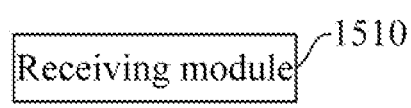
FIG. 15 is a structural block diagram illustrating a communication apparatus according to an embodiment of the present disclosure.

Please refer to FIG. 15, which is a structural block diagram illustrating a communication apparatus according to an embodiment of the present disclosure. The communication apparatus may be implemented as an entirety or a part of a first device by software, hardware or a combination thereof, where the first device is located at a first position. The apparatus includes:

a receiving module 1510, configured to receive indication information transmitted by a second device, where the indication information includes information of a second position and wireless signal information corresponding to the second position, and the second position is different from the first position.

In a possible manner, the apparatus further includes a driving module, Where the driving module is configured to drive the apparatus move to the second position in a case where wireless signal strength corresponding to the second position is higher than wireless signal strength of the first position; or the driving module is configured to drive the apparatus to move to the second position in a case where wireless signal quality corresponding to the second position is higher than wireless signal quality of the first position; or the driving module is configured to drive the apparatus to move to the second position in a case where wireless signal strength corresponding to the second position is higher than wireless signal strength of the first position and wireless signal quality corresponding to the second position is higher than wireless signal quality of the first position.

In a possible manner, the indication information in relation to the apparatus is transmitted through one kind of the following signaling: radio resource control RRC signaling; media access control control element MAC CE; downlink control information DCI, or sidelink control information SCI.

In a possible manner, the wireless signal information in relation to the apparatus includes at least one kind of the following: received signal strength of a wireless signal, where the received signal strength includes reference signal received power RSRP; received signal quality of the wireless signal, where the received signal quality includes reference signal received quality RSRQ anchor a signal to interference plus noise ratio SINR a rate of the wireless signal; or time domain information corresponding to the information of the second position and the wireless signal information.

In a possible manner, the wireless signal in relation to the apparatus beam-level wireless signal or a cell-level wireless signal.

In a possible manner, the information of the second position in relation to the apparatus includes at least one kind of the following: position information of the second position based on a navigation satellite; position information of the second position using the position of the first device as a reference; or position information of the second position using the position of the second device as a reference.

In a possible manner, the position information of the second position using the position of the first device as the reference in relation to the apparatus includes: a directional angle between the second position and the first position, and a distance between the second position and the first position.

In a possible manner, the position information of the second position using the position of the second device as the reference in relation to the apparatus includes: a directional angle between the second position and a position at which the second device is located, and a distance between the second position and the position at which the second device is located.

In a possible manner, the second device in relation to the apparatus is an access network device, and the wireless signal information is used to indicate received signal strength and/or received signal quality of a reference signal transmitted by the access network device through a tin interface or the second device is a user equipment UE, and the wireless signal information is used to indicate received signal strength and/or received signal quality of a reference signal transmitted by the UE through a sidelink interface.

In a possible manner, the second position in relation to the apparatus is a position where the first device will pass at a first time, and the first time is a future time relative to a current system time.

Figure 16:
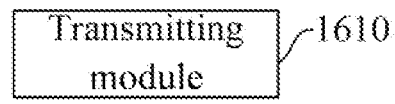
FIG. 16 is a structural block diagram illustrating another communication apparatus according to an embodiment of the present disclosure.

Please refer to FIG. 16, which is a structural block diagram illustrating another communication apparatus according to an embodiment of the present disclosure. The communication apparatus may be implemented as an entirety or a part of a second device by software, hardware or a combination thereof. The apparatus includes:

a transmitting module 1610, configured to transmit indication information to a first device, where the indication information includes information of a second position and wireless signal information corresponding to the second position.

In a possible manner, the indication information in relation to the apparatus is transmitted through one kind of the following signaling: radio resource control RRC signaling; media access control control element MAC CE, downlink control information DCI; or sidelink control information SCI.

In a possible manner, the wireless signal information in relation to the apparatus includes at least one kind of the following: received signal strength of a wireless signal, where the received signal strength includes reference signal received power RSRP, received signal quality of the wireless signal, where the received signal quality includes reference signal received quality RSRQ and/or a signal to interference plus noise ratio SINR; a rate of the wireless signal; or time domain information corresponding to the information of the second position and the wireless signal information.

In a possible manner, the wireless signal in relation to the apparatus is a beam-level wireless signal or a cell-level wireless signal.

In a possible manner, the information of the second position in relation to the apparatus includes at least one kind of the following: position information of the second position based on a navigation satellite; position information of the second position using the position of the first device as a reference; or position information of the second position using the position of the second device as a reference.

In a possible manner, the position information of the second position using the position of the first device as the reference in relation to the apparatus includes: a directional angle between the second position and the first position, and a distance between the second position and the first position.

In a possible manner, the position information of the second position using the position of the second device as the reference in relation to the apparatus includes: a directional angle between the second position and a position at which the second device is located, and a distance between the second position and the position at which the second device is located.

In a possible manner, the second device in relation to the apparatus is an access network device, and the wireless signal information is used to indicate received signal strength and/or received signal quality of a reference signal transmitted by the access network device through a Uu interface; or the second device is a user equipment UE, and the wireless signal information is used to indicate received signal strength and/or received signal quality of a reference signal transmitted by the UE through a sidelink interface.

In a possible manner, the second position in relation to the apparatus is a position where the first device will pass at a first time, and the first time is a future time relative to a current system time.

Figure 17:
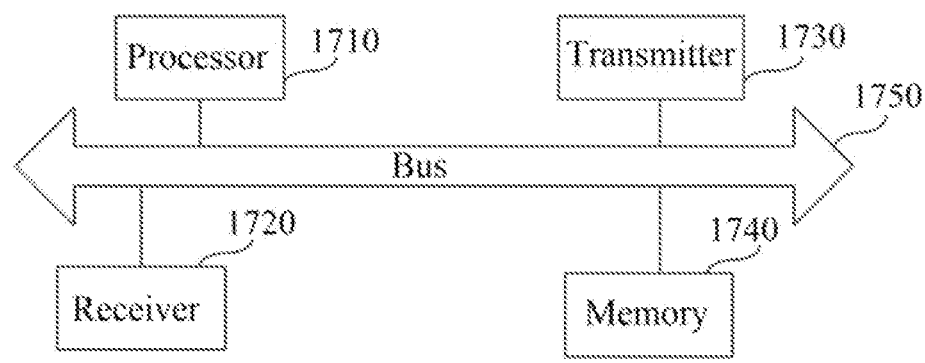
FIG. 17 is a schematic structural diagram illustrating a first device according to an exemplary embodiment of the present disclosure.

Please refer to FIG. 17, which is a schematic structural diagram illustrating a first device according to an exemplary embodiment of the present disclosure. The first device includes a processor 1710, a receiver 1720, a transmitter 1730, a memory 1740, and a bus 1750.

The processor 1710 includes one or more processing cores, and the processor 1710 executes various functional applications and information processing by running software programs and modules.

The receiver 1720 and the transmitter 1730 may be implemented as a communication component which may be a single communication chip.

The memory 1740 is connected to the processor 1710 via the bus 1750.

The memory 1740 may be configured to store at least one instruction, and the processor 1710 is configured to execute the at least one instruction to implement the steps in the foregoing method embodiments.

In addition, the memory 1740 may be implemented by any type of volatile or non-volatile storage device or a combination thereof. The volatile or non-volatile storage device includes, but is not limited to: a magnetic disk or an optical disk, an electrically erasable programmable read only memory (EEPROM), an erasable programmable read only memory (EPROM), a static random access memory (SRAM), a read only memory (ROM), a magnetic memory, a flash memory, a programmable read only memory (PROM).

Figure 18:
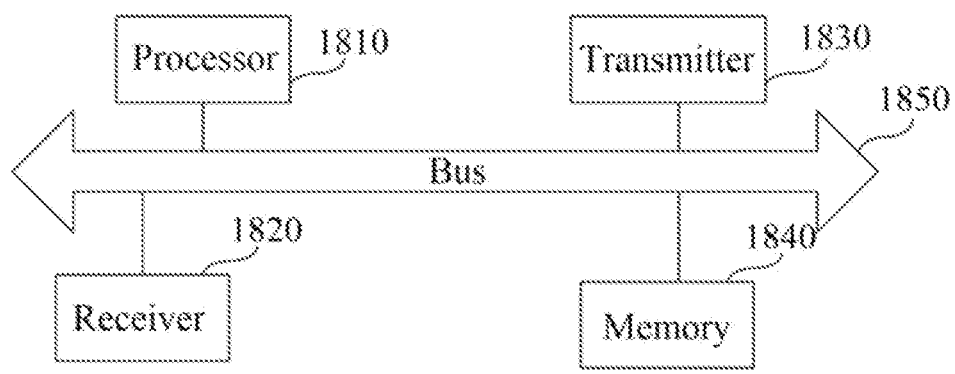
FIG. 18 is a schematic structural diagram of a second device according to an exemplary embodiment of the present disclosure.

Please refer to FIG. 18, which is a schematic structural diagram of a second device according to an exemplary embodiment of the present disclosure. The second device includes a processor 1810, a receiver 1820, a transmitter 1830, a memory 1840, and a bus 1850.

The processor 1810 includes one or more processing cores, and the processor 1810 executes various functional applications and information processing by running software programs and modules.

The receiver 1820 and the transmitter 1830 may be implemented as a communication component which may be a single communication chip.

The memory 1840 is connected to the processor 1810 via the bus 1850.

The memory 1840 may be configured to store at least one instruction, and the processor 1810 is configured to execute the at least one instruction to implement the steps in the foregoing method embodiments.

In addition, the memory 1840 may be implemented by any type of volatile or non-volatile storage device or a combination thereof. The volatile or non-volatile storage device includes, but is not limited to: a magnetic disk or an optical disk, an electrically erasable programmable read only memory (EEPROM), an erasable programmable read only memory (EPROM), a static random access memory (SRAM), a read only memory (ROM), a magnetic memory, a flash memory, a programmable read only memory (PROM).

In another aspect, a computer readable storage medium is provided, where the storage medium has at least one instruction stored thereon, and the at least one instruction is used for execution by a processor to implement the communication method implemented by the first device.

In another aspect, a computer readable storage medium is provided, where the storage medium has at least one instruction stored thereon, and the at least one instruction is used for execution by a processor w implement the communication method implemented by the second device.

In another aspect, a communication system is provided, including the first device and the second device.

Persons of ordinary skill in the art may understand that, all or a part of the steps of the foregoing embodiments ma be implemented by hardware or by a program instructing relevant hardware. The program may be stored in a computer readable storage medium. The above-mentioned storage medium may be a read only memory, a magnetic disk, or an optical disc.

The above descriptions are only preferred embodiments of the present disclosure, but are not intended to limit the present disclosure. Any modifications, equivalent replacements, improvements, etc., made within the spirit and principle of the present disclosure, should be included in the protection scope of the present disclosure.

What is claimed is:

1. A communication method, applied to a first device, wherein the first device is located at a first position and has autonomous mobility, and the method comprises:
  receiving indication information transmitted by a second device, wherein the indication information comprises information of multiple second positions and wireless signal information corresponding to the multiple second positions, multiple second positions are connected into a route for data transmission and each of the multiple second positions are different from the first position;
  wherein the method further comprises:
  moving along the route in a case where multiple wireless signal strengths corresponding to the multiple second positions are higher than wireless signal strength of the first position and multiple wireless signal qualities corresponding to the multiple second positions are higher than wireless signal quality of the first position;
  wherein the wireless signal information comprises at least one kind of the following:
  a rate of the wireless signal;
  time domain information corresponding to the information of the multiple second positions and the wireless signal information.

2. The method according to claim 1, wherein the indication information is transmitted through one kind of the following signaling:
  radio resource control (RRC) signaling;
  media access control control element (MAC CE);
  downlink control information (DCI);
  sidelink control information (SCD).

3. The method according to claim 1, wherein the wireless signal is a beam-level wireless signal or a cell-level wireless signal.

4. The method according to claim 1, wherein the information of the multiple second positions comprises at least one kind of the following:
  position information of the multiple second positions based on a navigation satellite;
  position information of the multiple second positions using a position of the first device as a reference;
  position information of the multiple second positions using a position of the second device as a reference.

5. The method according to claim 4, wherein the position information of the multiple second positions using the position of the first device as the reference comprises: multiple directional angles between the multiple second positions and the first position, and multiple distances between the multiple second positions and the first position.

6. The method according to claim 4, wherein the position information of the multiple second positions using the position of the second device as the reference comprises: multiple directional angles between the multiple second positions and a position at which the second device is located, and multiple distances between the multiple second positions and the position at which the second device is located.

7. The method according to claim 1, wherein:
  the second device is an access network device, and the wireless signal information is used to indicate received signal strength and/or received signal quality of a reference signal transmitted by the access network device through a Uu interface; or
  the second device is a user equipment (UE), and the wireless signal information is used to indicate received signal strength and/or received signal quality of a reference signal transmitted by the UE through a sidelink interface.

8. The method according to claim 1, wherein each of the multiple second positions is a position where the first device will pass at one of multiple first times, and the one of multiple first times is a future time relative to a current system time.

9. A first device, wherein the first device is located at a first position and has autonomous mobility, and the first device comprises: a processor and a memory, wherein the memory has at least one instruction stored thereon, and the at least one instruction is used for execution by the processor to enable the first device to:
  receive indication information transmitted by a second device, wherein the indication information comprises information of multiple second positions and wireless signal information corresponding to the multiple second positions, multiple second positions are connected into a route for data transmission and each of the multiple second positions are different from the first position;
  wherein the at least one instruction is used for execution by the processor to enable the first device to:
  move along the route in a case where multiple wireless signal strengths corresponding to the multiple second positions are higher than wireless signal strength of the first position and multiple wireless signal qualities corresponding to the multiple second positions are higher than wireless signal quality of the first position;
  wherein the wireless signal information comprises at least one kind of the following:
  a rate of the wireless signal;
  time domain information corresponding to the information of the multiple second positions and the wireless signal information.

10. A second device, comprising: a processor and a memory, wherein the memory has at least one instruction stored thereon, and the at least one instruction is used for execution by the processor to enable the second device to:
  transmit indication information to a first device, wherein the indication information comprises information of multiple second positions and wireless signal information corresponding to the multiple second positions, multiple second positions are connected into a route for data transmission, the first device is located at a first position and has autonomous mobility, and each of the multiple second positions are different from the first position;
  wherein the first device moves along the route in a case where multiple wireless signal strengths corresponding to the multiple second positions are higher than wireless signal strength of the first position and multiple wireless signal qualities corresponding to the multiple second positions are higher than wireless signal quality of the first position;

wherein the wireless signal information comprises at least one kind of the following:

a rate of the wireless signal;

time domain information corresponding to the information of the multiple second positions and the wireless signal information.

11. The second device according to claim 10, wherein the indication information is transmitted through one kind of the following signaling:

radio resource control (RRC) signaling;
media access control control element (MAC CE);
downlink control information (DCI);
sidelink control information (SCI).

12. The second device according to claim 10, wherein the wireless signal is a beam-level wireless signal or a cell-level wireless signal.

13. The second device according to claim 10, wherein the information of the multiple second positions comprises at least one kind of the following:

position information of the multiple second positions based on a navigation satellite;

position information of the multiple second positions using a position of the first device as a reference;

position information of the multiple second positions using a position of the second device as a reference.

14. The second device according to claim 13, wherein the position information of the multiple second positions using the position of the first device as the reference comprises: multiple directional angles between the multiple second positions and the first position, and multiple distances between the multiple second positions and the first position;

wherein the position information of the multiple second positions using the position of the second device as the reference comprises: multiple directional angles between the multiple second positions and a position at which the second device is located, and multiple distances between the multiple second positions and the position at which the second device is located.

15. The second device according to claim 10, wherein:

the second device is an access network device, and the wireless signal information is used to indicate received signal strength and/or received signal quality of a reference signal transmitted by the access network device through a Uu interface; or the second device is a user equipment (UE), and the wireless signal information is used to indicate received signal strength and/or received signal quality of a reference signal transmitted by the UE through a sidelink interface.

16. The second device according to claim 10, wherein each of the multiple second positions is a position where the first device will pass at one of multiple first times, and the one of multiple first times is a future time relative to a current system time.

* * * * *